United States Patent
Schneider

(10) Patent No.: US 11,791,895 B2
(45) Date of Patent: Oct. 17, 2023

(54) OPTICAL TRANSMISSION/RECEPTION UNIT AND APPARATUS FOR SIGNAL TRANSFER

(71) Applicant: Fraunhofer-Gesellschaft zur Förderung der angewandten Forschung e.V., Munich (DE)

(72) Inventor: Tobias Schneider, Dresden (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/059,094

(22) Filed: Nov. 28, 2022

(65) Prior Publication Data

US 2023/0268995 A1  Aug. 24, 2023

Related U.S. Application Data

(63) Continuation of application No. 17/412,375, filed on Aug. 26, 2021, now Pat. No. 11,515,942, which is a
(Continued)

(30) Foreign Application Priority Data

Feb. 28, 2019  (DE) .......................... 102019202766.0

(51) Int. Cl.
| | |
|---|---|
| H04B 10/112 | (2013.01) |
| H04B 10/25 | (2013.01) |
| H04B 10/43 | (2013.01) |

(52) U.S. Cl.
CPC ..... *H04B 10/1125* (2013.01); *H04B 10/1121* (2013.01); *H04B 10/2589* (2020.05); *H04B 10/43* (2013.01)

(58) Field of Classification Search
CPC ............ H04B 10/1125; H04B 10/1121; H04B 10/2589; H04B 10/43; H04B 10/1143;
(Continued)

(56) References Cited

U.S. PATENT DOCUMENTS

| | | | |
|---|---|---|---|
| 4,401,360 A | 8/1983 | Streckmann et al. | |
| 5,790,291 A | * 8/1998 | Britz ...................... | H04B 10/11 |
| | | | 379/56.1 |

(Continued)

FOREIGN PATENT DOCUMENTS

| | | |
|---|---|---|
| CN | 102122036 A | 7/2011 |
| CN | 102667560 A | 9/2012 |

(Continued)

OTHER PUBLICATIONS

International Search Report and Written Opinion dated Jun. 9, 2020, issued in application No. PCT/EP2020/054905.
(Continued)

*Primary Examiner* — Abbas H Alagheband
(74) *Attorney, Agent, or Firm* — McClure, Qualey & Rodack, LLP

(57) ABSTRACT

An optical transmission/reception unit includes a carrier rotatable around an axis of rotation, an optical receiver arranged at the carrier on the axis of rotation so as to receive an optical reception signal from a first direction, an optical transmitter arranged at the carrier adjacent to the optical receiver so as to emit an optical transmission signal in a second direction, and a transmission/reception optic arranged at the carrier on the axis of rotation above the optical receiver and extending across the optical receiver and the optical transmitter, wherein the transmission/reception optic includes a reception optic and a transmission optic arranged in the reception optic, wherein the reception optic is configured to guide the optical reception signal striking
(Continued)

the transmission/reception optic towards the optical receiver on the axis of rotation.

20 Claims, 7 Drawing Sheets

Related U.S. Application Data continuation of application No. PCT/EP2020/054905, filed on Feb. 25, 2020.

(58) Field of Classification Search
CPC .. H04B 10/501; H04B 10/803; H04B 10/671; G02B 26/0875; G02B 6/4246
USPC .......................................................... 398/129
See application file for complete search history.

(56) References Cited

U.S. PATENT DOCUMENTS

| | | | |
|---|---|---|---|
| 5,825,792 A | 10/1998 | Villeneuve et al. | |
| 5,828,146 A * | 10/1998 | Lorenz ................. | G02B 6/3604 310/68 E |
| 5,946,118 A | 8/1999 | Flaherty | |
| 6,353,693 B1 * | 3/2002 | Kano ................... | H04B 10/801 398/112 |
| 6,359,712 B1 * | 3/2002 | Kamitani ........... | H04B 10/1143 398/118 |
| 6,434,293 B1 | 8/2002 | Igeta et al. | |
| 10,164,717 B2 * | 12/2018 | Kakimoto ............ | G02B 6/3604 |
| 10,516,490 B2 | 12/2019 | Sundaram | |
| 2002/0126967 A1 * | 9/2002 | Panak ....................... | H04L 5/16 385/101 |
| 2002/0141011 A1 | 10/2002 | Green et al. | |
| 2003/0053769 A1 | 3/2003 | Schunk | |
| 2004/0240885 A1 | 12/2004 | Naoe et al. | |
| 2005/0031350 A1 | 2/2005 | Haber | |
| 2005/0129407 A1 * | 6/2005 | Coleman ............ | H04B 10/1123 398/130 |
| 2006/0274999 A1 | 12/2006 | Wu et al. | |
| 2007/0140620 A1 * | 6/2007 | Schorpp ............... | G02B 6/3604 385/47 |
| 2008/0069495 A1 * | 3/2008 | Hirohashi ............ | H04B 10/801 385/25 |
| 2010/0166433 A1 | 7/2010 | Fujimoto et al. | |
| 2011/0058817 A1 * | 3/2011 | Kuo ...................... | H04B 10/803 398/130 |
| 2011/0150493 A1 | 6/2011 | Nakaso et al. | |
| 2011/0170832 A1 | 7/2011 | Yamai et al. | |
| 2011/0310364 A1 | 12/2011 | Wakabayashi | |
| 2012/0057818 A1 * | 3/2012 | Zeiger ................. | G02B 6/3604 385/25 |
| 2012/0237198 A1 | 9/2012 | Bowman | |
| 2012/0275795 A1 * | 11/2012 | Chan .................... | H04B 10/116 398/128 |
| 2013/0236183 A1 * | 9/2013 | Chao .................... | H04B 10/116 398/101 |
| 2014/0314404 A1 | 10/2014 | Tseng | |
| 2015/0270900 A1 * | 9/2015 | Hilario .................. | H04B 10/40 398/140 |
| 2016/0380406 A1 | 12/2016 | Huang et al. | |
| 2017/0244490 A1 * | 8/2017 | Hallal .................... | H04B 10/80 |
| 2017/0311425 A1 | 10/2017 | De Samber et al. | |
| 2018/0329065 A1 * | 11/2018 | Pacala ................. | H01L 27/1446 |
| 2019/0305847 A1 * | 10/2019 | Sharp .................... | H04B 17/24 |
| 2020/0336210 A1 * | 10/2020 | Khatibzadeh ....... | H04B 10/1149 |

FOREIGN PATENT DOCUMENTS

| | | |
|---|---|---|
| CN | 106797688 A | 5/2017 |
| CN | 106802412 A | 6/2017 |
| DE | 44 28 790 C1 | 2/1996 |
| DE | 10 2014 225 097 A1 | 6/2016 |
| EP | 0 683 574 A1 | 11/1995 |
| JP | 2015-111282 A | 6/2015 |
| WO | 2016/028226 A1 | 2/2016 |

OTHER PUBLICATIONS

English language translation of International Search Report dated Jun. 9, 2020, issued in application No. PCT/EP2020/054905.
Törring, J.T.; "Wie funktioniert eine Linse?;" https://www.sonnentaler. net/dokumentation/wiss/optik/weiter/linse-fun . . . ; Jul. 28, 2008; pp. 1-4.
German language office action dated Nov. 25, 2021, issued in application No. EP 19717273.7.
Notice of Allowance dated Mar. 23, 2022, issued in U.S. Appl. No. 17/064,499.
Chinese language office action dated Aug. 23, 2023, issued in application No. CN 202080031848.4.

* cited by examiner

OPTICAL TRANSMISSION/RECEPTION UNIT AND APPARATUS FOR SIGNAL TRANSFER

CROSS-REFERENCES TO RELATED APPLICATIONS

This application is a continuation of U.S. application Ser. No. 17/412,375, filed Aug. 26, 2021, now U.S. Pat. No. 11,515,942, which is a continuation of co-pending International Application No. PCT/EP2020/054905, filed Feb. 25, 2020, which is incorporated herein by reference in its entirety, and additionally claims priority from German Application No. DE 10 2019 202 766.0, filed Feb. 28, 2019, which is incorporated herein by reference in its entirety.

The present invention relates to the field of signal transfer, in particular to the optical data transfer across two components that are arranged rotatably with respect to each other. Embodiments concern an optical transmission/reception unit, in particular a rotatable optical short-range transmission/reception unit for optical wireless data transfer using a special optic design.

BACKGROUND OF THE INVENTION

In the conventional technology, several approaches are known to enable a signal transfer, e.g. a data transfer between two components that are arranged rotatably with respect to each other. Either both components are supported rotatably, or one of the components is arranged to be rotatable relative to the other one. Conventional approaches solve the problem of the data transfer across two components that rotate with respect to each other by employing cables, wherein slip rings or contact brushes are used to transfer the electric signals at the point of rotation. Such contact-based transfer approaches are disadvantageous since, due to the contact-based transfer technology, the service life of the point of rotation and therefore the service life of the overall system is reduced, or limited, in particular due to wear of the contacts. In addition, the multi-directional signal propagation of the electric signal on the slip ring causes a multipath propagation that may lead to runtime differences of the individual electric signals, which may cause a limitation of the transfer bandwidth.

Other approaches to avoid the disadvantages of contact-based transfer technologies in the signal transfer across a point of rotation known in the conventional technology use an optical wireless data transfer using optical transmission/reception units or transceivers that are provided in the components arranged to be rotatable relative to each other. This optical approach has the advantage that the components operate free of wear and therefore would not limit the service life of the overall system. Also, the above-mentioned multipath propagation of the signal is avoid so that such optical wireless data transfer systems avoid a limitation of the transfer bandwidth so that high data rates are achievable, e.g. 100 Mbit/s and more.

FIG. 1 shows a schematic illustration of a conventional signal transfer apparatus including two optical wireless transmission/reception units, wherein FIG. 1A illustrates a position of the two optical transmission/reception units with an intact data connection, or an intact data link, between them, and wherein FIG. 1B illustrates the two transmission/reception units being rotated with respect to each other so that the data connection is interrupted.

FIG. 1A shows a first transmission/reception means 100a comprising an optical transmitter 102a and an optical receiver 104a. In addition, FIG. 1A illustrates an axis of rotation 106 around which the first transmission/reception unit 100a is rotatable. The optical transmitter 102a and the optical receiver 104a are arranged in the transmission/reception unit 100a spaced apart from the axis of rotation 106. For the optical data transfer, the optical transmitter 102a generates a first transmission beam 108a directed towards a second transmission/reception unit 100b. The second transmission/reception unit includes an optical transmitter 102b and an optical receiver 104b arranged on both sides of the axis of rotation 106. The second transmission/reception unit is arranged to be rotatable around the axis of rotation 106, as is indicated by the arrow 106b. In the example illustrated in FIG. 1A, the two transmission/reception units 100a, 100b are orientated with respect to each other such that the optical transmitter 102a in the first transmission/reception unit 100a is opposite to the optical receiver 104b in the second transmission/reception unit 102b and such that the optical transmitter 102b of the second transmission/reception unit 100b is opposite to the optical receiver 104a in the first transmission/reception unit 100a. The transmission beams 108a and 108b emitted by the optical transmitters 102a and 102b, respectively, are directed to the opposite optical receivers 104b and 104a, respectively. When orientating the two transmission/reception units 100a, 100b according to the illustration in FIG. 1A, a bidirectional data transfer is possible, or, when using only one of the optical transmitters, a unidirectional data transfer is possible. In other words, the data transfer between the two transmission/reception units 100a, 100b is intact.

The conventional apparatus for the optical wireless data transfer across a point of rotation illustrated on the basis of FIG. 1A has the disadvantage that an orientation of the corresponding transmitters/receivers of the two rotatable, or relatively rotatable, transmission/reception units has to be such that, in other words, the transmitters and receivers are in visual contact. However, if the transmission/reception units 100a, 100b are rotated out of the position illustrated in FIG. 1A, e.g. the first transmission/reception unit 100a is rotated by 180° with respect to the second transmission/reception unit 100b, as is illustrated in FIG. 1B, the transmitters and receivers are no longer opposite to each other. Rather, as can be seen, the corresponding transmitters and the corresponding receivers in the two transmission/reception units 100a, 100b, respectively, are opposite each other. In other words, there is no visual contact between transmitters and receivers in the two opposite transmission/reception units, or the visual contact is lost, so that the data connection is interrupted.

U.S. Pat. No. 4,401,360 A describes an optical slip ring for an optical communication between a pair of elements that can rotate freely with respect to each other. These elements may be a pair of optical fibers, an electric conductor and an optical fiber, or a pair of electric conductors. One element is attached at a first mounting apparatus and the other element is fixed at a second mounting apparatus. An optical receiver is positioned in the middle of the first mounting apparatus on a mutual axis of rotation with respect to the second mounting apparatus. The other optical receiver is arranged at the second mounting apparatus on the mutual axis of rotation. An optical emitter is attached off-center at the first mounting apparatus, and the other optical emitter is mounted off-center at the second mounting apparatus. The optical transmitter mounted at the first mounting apparatus is directed to the optical receiver mounted at the second mounting apparatus, and the optical transmitter mounted at the second mounting apparatus is directed to the optical receiver mounted at the first optical apparatus.

SUMMARY

According to an embodiment, an optical transmission/reception unit may have: a carrier rotatable around an axis of rotation, an optical receiver arranged at the carrier on the axis of rotation so as to receive an optical reception signal from a first direction, an optical transmitter arranged at the carrier adjacent to the optical receiver so as to emit an optical transmission signal in a second direction, and a transmission/reception optic arranged at the carrier on the axis of rotation above the optical receiver and extending across the optical receiver and the optical transmitter, wherein the transmission/reception optic comprises a reception optic configured to focus the optical reception signal striking the transmission/reception optic towards the optical receiver on the axis of rotation, and wherein the transmission/reception optic comprises a transmission optic arranged in the reception optic and configured to guide onto the axis of rotation the optical transmission signal emitted by the optical transmitter so that a transmission beam propagates from the transmission/reception optic along the axis of rotation.

According to another embodiment, an apparatus for a signal transfer may have at least one inventive first optical transmission/reception unit and at least one inventive second optical transmission/reception unit; wherein the first and second optical transmission/reception units are arranged in such a way with respect to each other that a transmission beam of a transmission/reception unit illuminates the receiver optic of an opposite transmission/reception unit.

According to the invention, it has been recognized that the problem of the data transfer in the case of a conventional signal transfer apparatus including two optical wireless transmission/reception units occurs in particular if the distance d between the two transmission/reception units or transceivers is in the order of magnitude of the transceiver size, e.g. if the distance is smaller than a radius of the transmission/reception units. For example, such short dimensions of the distance d occur in applications in which a data connection is to be provided between printed circuit boards (PCBs), or in the use of the apparatus of FIG. 1 as an optical slip ring replacement on rotating machinery parts. In other words, the small distance of the transmission/reception units leads to the transmission beam emitted by the corresponding optical transmitters not expanding sufficiently to reach the corresponding receiver of the opposite transmission/reception unit even in case of a rotation of the transmission/reception units with respect to each other, so that the situation illustrated in FIG. 1B occurs, which, in case of a rotation of the components on which the corresponding transmission/reception units 100a, 100b are arranged relative to each other, may lead to interruptions of the data transfer, i.e. so that a continuous data connection between the two components is not ensured via the conventional apparatus shown in FIG. 1.

The present invention is based on the finding that the above-discussed problem in conventional rotatable optical short/range transceivers for an optical wireless data transfer is grounded in the arrangement of the optical transmitter and/or the optical receiver. In transmission/reception units as described on the basis of FIG. 1, the optical transmitter includes a light source, and the radiation profile of the transmission beam is shaped by a transmission optic. For example, the optical receiver includes a photodiode that, in turn, has assigned to it its own reception optic so as to collect the received transmission beam, i.e. the received light signal. These two elementary components of the rotatable optical short-range transceiver are arranged next to each other, as described on the basis of FIG. 1, so the axis of rotation extends between the two units, i.e. the transmitter and the receiver. As described above, this configuration leads to the fact that, in the case of a distance between the two transceivers being small compared to the size of the transceiver, a rotation of the elements with respect to each other is not possible or is possible only to a small extent, i.e. a large rotation of the two transceivers with respect to each other leads to an interruption of the transfer since the transmitters and receivers in the corresponding transceivers are no longer in visible contact.

To solve this problem, the present invention proposes a configuration of an optical transmission/reception unit in which the conventional arrangement of transmitters and receivers as well as the conventional provision of a separate reception and transmission optic are refrained from, and to instead provide a special optic design that connects the reception optic and the transmission optic, enabling an arrangement of the optical transmitter and the optical receiver that allows a reliable data transfer between two transmission/reception units, regardless of how they are rotated with respect to each other.

The present invention provides an optical transmission/reception unit, comprising:

a carrier rotatable around an axis of rotation, an optical receiver arranged at the carrier on the axis of rotation so as to receive an optical reception signal from a first direction, an optical transmitter arranged at the carrier adjacent to the optical receiver so as to emit an optical transmission signal in a second direction, and a transmission/reception optic arranged at the carrier on the axis of rotation above the optical receiver and extending across the optical receiver and the optical transmitter, wherein the transmission/reception optic includes a reception optic and a transmission optic arranged in the reception optic, wherein the reception optic is configured to guide the optical reception signal striking the transmission/reception optic towards the optical receiver on the axis of rotation, and wherein the transmission optic is configured to displace onto the axis of rotation the optical transmission signal emitted by the optical transmitter so that a transmission beam leaves the transmission/reception optic in the area of the axis of rotation.

In addition, the present invention provides an apparatus for a signal transfer, comprising at least one first optical transmission/reception unit according to the present invention and at least one second optical transmission/reception unit according to the present invention, wherein the first and second optical transmission/reception units are arranged in such a way with respect to each other that a transmission beam of a transmission/reception unit illuminates the receiver optic of an opposite transmission/reception unit.

It is an advantage of the inventive transmission/reception unit that a continuous, or uninterrupted, data transfer is ensured between two such transmission/reception units, regardless of how the two transmission/reception units are arranged rotated with respect to each other around the optical axis. The problems of a data transfer interruption discussed in connection to FIG. 1 are avoided. In other words, the inventive transmission/reception unit ensures that, in case of its use in an apparatus for the optical data transfer between two components rotatable relative to each other, visual contact between the optical transmitter in one of the components and the optical transmitter in the other one of the components is ensured, regardless of a rotation of the respective components with respect to each other. This avoids undesired or even dangerous interruptions of the data transfer. In addition, an increase of the data transfer rate across an optical interface may be achieved.

According to embodiments, the transmission optic displaces the optical transmission signal emitted by the optical transmitter in such a way onto the axis of rotation that the transmission beam centrally exits the transmission/reception optic.

According to embodiments, the transmission optic displaces the optical transmission signal emitted by the optical transmitter in such a way onto the axis of rotation that the transmission beam is essentially parallel to the axis of rotation.

According to embodiments, the transmission optic is formed into the reception optic or is integrated into the reception optic.

According to embodiments, the transmission optic is formed by a first portion of a surface of the reception optic facing the optical receiver and a second portion of a surface of the reception optic facing away from the optical receiver, wherein the first portion is configured to deflect towards the axis of rotation the optical transmission signal emitted by the optical transmitter and to guide the same onto the second portion, and wherein the second portion is configured to deflect in parallel to the axis of rotation the optical transmission signal received from the first portion.

According to embodiments, the first portion is arranged above the optical transmitter.

According to embodiments, the second portion is arranged on the axis of rotation or adjacent to the axis of rotation.

According to embodiments, the first portion is formed by a projection in the surface of the reception optic facing the optical receiver, and the second portion is formed by a recess in the surface of the reception optic facing away from the optical receiver.

According to embodiments, the recess comprises a first surface extending, starting from the surface facing away from the optical receiver, essentially in parallel to the axis of rotation into the reception optic, and the recess comprises a second surface adjacent to the first surface and extending, starting from the first surface, at an angle of less than or equal to 90° with respect to the carrier towards the surface facing away from the optical receiver.

According to embodiments, the angle is larger than 0° and smaller than a total reflection angle of the material used.

According to embodiments, the first surface is arranged adjacent to the axis of rotation and the second surface intersects the axis of rotation, or the first surface is arranged adjacent to the axis of rotation and the second surface extends away from the axis of rotation.

According to embodiments, the first portion comprises a first transmission face arranged above the optical transmitter and tilting towards the axis of rotation the optical transmission signal emitted by the optical transmitter, and the second portion comprises a second transmission face arranged centrally on the surface of the reception optic facing away from the optical receiver and tilting in parallel to the axis of rotation the optical transmission signal received from the first transmission face.

According to embodiments, the first transmission face and the second transmission face each comprise a plane face in parallel with each other so as to cause a lateral displacement of the optical transmission signal towards the axis of rotation.

According to embodiments, the first transmission face and the second transmission face are configured as a spherical, aspherical or free-form optic so as to also cause, beside a lateral displacement of the optical transmission signal towards the axis of rotation, a beam formation of the optical transmission signal in order to obtain a desired transmission beam.

According to embodiments, the first transmission face and the second transmission face are configured differently.

According to embodiments, the first portion comprises a transmission face arranged above the optical transmitter and tilting towards the axis of rotation the optical transmission signal emitted by the optical transmitter, and the second portion is configured to tilt in parallel to the axis of rotation the optical transmission signal received from the first transmission face.

According to embodiments, the first portion above the optical transmitter is configured to tilt towards the axis of rotation the optical transmission signal emitted by the optical transmitter, and the second portion comprises a transmission face arranged centrally on the surface of the reception optic facing away from the optical receiver and tilting in parallel to the axis of rotation the optical transmission signal received from the first portion.

According to embodiments, the transmission face is configured as a spherical, aspherical or free-form optic so as to cause a beam formation of the optical transmission signal in order to obtain a desired transmission beam.

According to embodiments, the carrier comprises a carrier surface from which the axis of rotation extends perpendicularly.

According to embodiments, the optical receiver and the optical transmitter are arranged on the carrier surface, or the optical receiver and the optical transmitter are arranged at the carrier surface with the same or different distances to the carrier surface.

According to embodiments, the optical transmission/reception unit includes at least one further optical transmitter arranged at the carrier adjacent to the optical receiver, wherein the transmission/reception optic comprises at least one further transmission optic arranged in the reception optic or integrated therein.

According to embodiments, the optical receiver includes a photodiode, PD, and the optical transmitter includes a laser diode, LD, or a light-emitting diode, LED.

According to embodiments, a wavelength of the optical reception signal and the optical transmission signal is in the ultra-violate range, in the visible range, or in the infrared range.

According to embodiments, the reception optic comprises a first reception face on the surface of the reception optic facing the optical receiver, and second reception face on the surface of the reception optic facing away from the optical receiver, wherein the first reception face and the second reception face are configured as a spherical, aspherical or free-form optic.

According to embodiments, the first reception face and the second reception face are configured differently.

According to embodiments, the apparatus is implemented for a bidirectional transfer in both directions or for a unidirectional transfer in only one direction.

According to embodiments, the axes of rotation of the first and second optical transmission/reception units form a mutual axis, or the axes of rotation of the first and second optical transmission/reception units comprise a specified offset.

According to embodiments, the specified offset is between 0 and larger than a radius of the transmission/reception optic.

According to embodiments, the first and the second optical transmission/reception units are arranged with a distance to each other, said distance being small compared to size of the transmission/reception units.

According to implementations, the distance is smaller than a diameter of the transmission/reception units.

BRIEF DESCRIPTION OF THE DRAWINGS

Embodiments of the present invention will be detailed subsequently referring to the appended drawings, in which:

FIG. 1A and FIG. 1B show schematic illustrations of a conventional signal transfer apparatus including two optical wireless transmission/reception units, wherein FIG. 1A illustrates a position of the two optical transmission/reception units with an intact data connection, or an intact datalink, between the same, and wherein FIG. 1B illustrates the two transmission/reception units rotated with respect to each other so that the data connection is interrupted.

FIG. 4A and FIG. 4B show embodiments for the configuration of the transmission/reception unit in a top view, wherein FIG. 4A illustrates a round, or circular, configuration of the transmission/reception unit 200, and FIG. 4B illustrates a rectangular or square configuration of the transmission/reception unit 200;

DETAILED DESCRIPTION OF THE INVENTION

Figure 1:
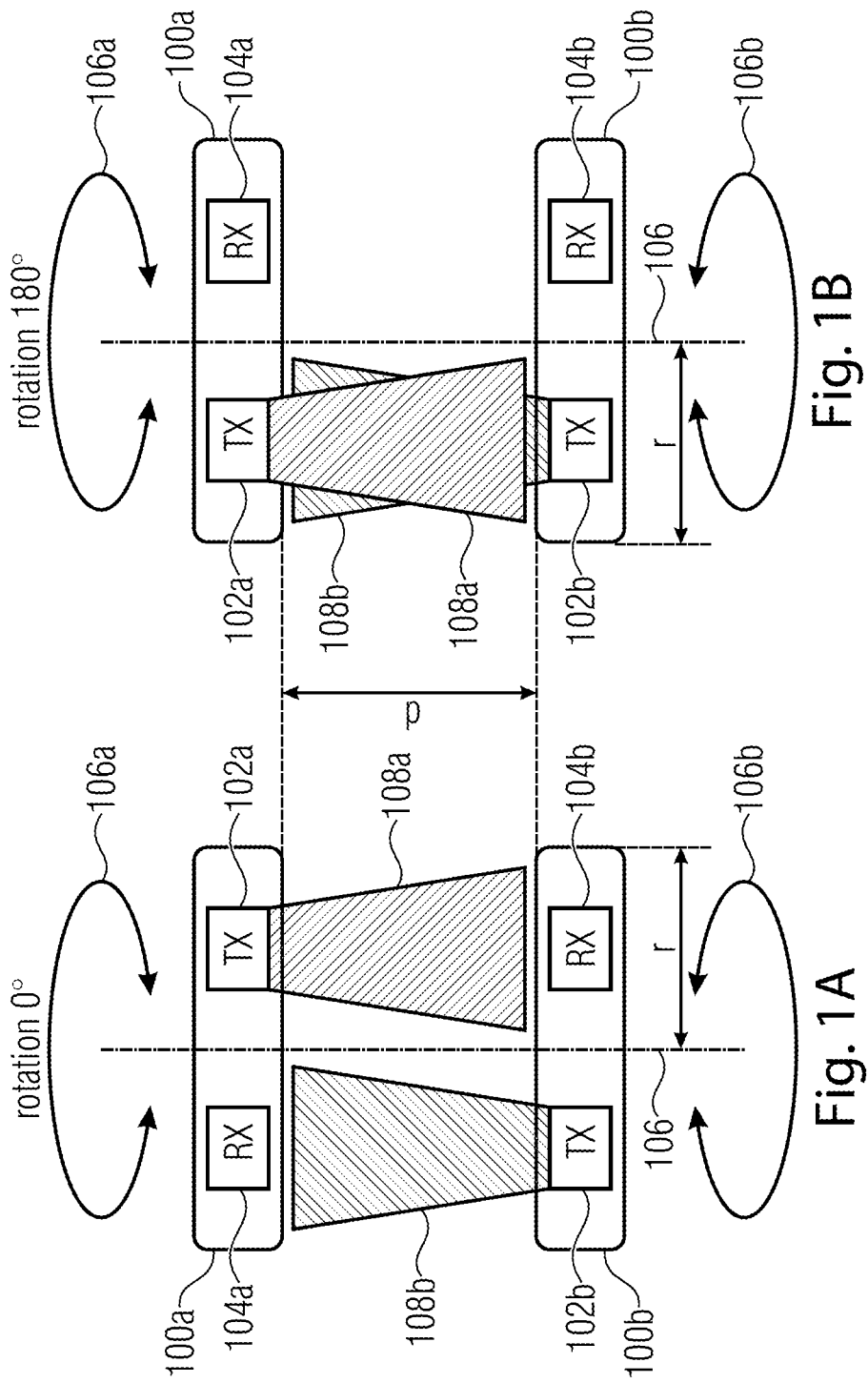

In the subsequent description of the embodiments of the present invention, similar elements or elements having the same effect are provided with the same reference numerals in the drawings.

Figure 2:
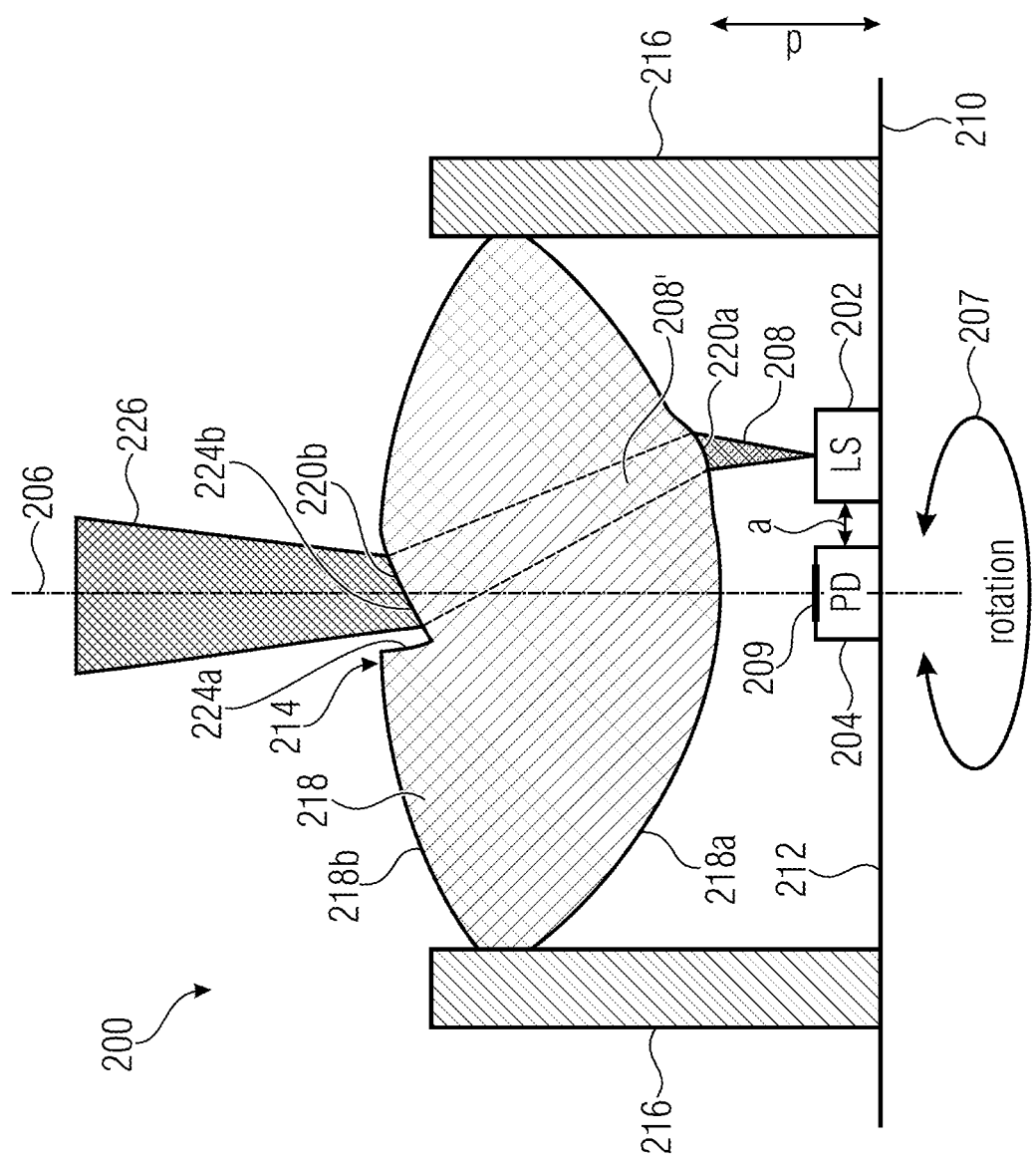
FIG. 2 shows the structure of transmission/reception unit according to an embodiment of the present invention.

FIG. 2 shows the structure of a transmission/reception unit according to an embodiment of the present invention. The transmission/reception unit 200 includes an optical transmitter 202 and an optical receiver 204. The transmission/reception unit 200 is arranged to be rotatable around the axis of rotation 206, as is indicated by the arrow 207. In addition, FIG. 2 illustrates the transmission beam 208 provided by the optical transmitter 202. The optical receiver 204 is arranged such that its position coincides with a position of the axis of rotation 206. The optical receiver 204 receives an optical reception signal from a first direction, and the optical transmitter 202 transmits an optical reception signal into a second direction essentially opposite the first direction. In the embodiment illustrated, the optical receiver 204, e.g., which may be formed by a photodiode, PD, includes an active face 209 for receiving incident light. The receiver 204 is arranged in the area of the axis of rotation 206 such that the axis of rotation 206 is arranged centrally on and perpendicular to the active face 209. In the illustrated embodiment, the transmission/reception unit, or the transceiver, 200 further includes a carrier 210, and in the illustrated embodiment, the optical transmitter 202 and the optical receiver 204 are arranged on a surface 212 of the carrier. The optical transmitter 202 is arranged offset to the axis of rotation 206 and spaced apart from the optical receiver 204. In other words, the optical receiver 204 is arranged centrally on the carrier 210 with respect to the axis of rotation 206, and the optical transmitter 206 is arranged off-center, or eccentrically, on the carrier 210 with respect to the axis of rotation 206. According to embodiments, the distance a between the optical receiver 204 and the optical transmitter 202 may depend on the system design.

In addition, the transmission/reception unit 200 includes a transmission/reception optic 214 arranged spaced apart from the carrier surface 212 and therefore spaced apart from the optical transmitter 202 and the optical receiver 204. The transmission/reception unit 200 includes a carrier structure 216 for attaching/mounting the transmission/reception optic 214. The carrier structure 216 is arranged on the carrier surface 212 of the carrier 210 and extends upwards, as illustrated in FIG. 2, so that the transmission/reception optic is arranged spaced apart from the carrier surface 212. According to an embodiment the transmission/reception optic is arranged with a distance d from the surface 212 of the carrier 210. For example, the distance is determined by the radiation angle of the transmitter so that the face 220a does not become too large. Typically, it is smaller than the radius of the optic 214 and may reach near the source. The distance d may be in the range between the lower limit just mentioned and the diameter of the optic 214. As illustrated in FIG. 2, the distance d is measured along the axis of rotation 208 from carrier surface 212 to the optic 214.

According to the invention, the transmission/reception optic 214 includes a reception optic 218 and transmission optic arranged in the reception optic 218. In other words, the transmission/reception optic is primarily formed by the reception optic 218 arranged on the axis of rotation 206 and extending across the optical receiver 204 and the optical transmitter 202. The transmission optic includes a first portion 220a arranged on a first surface 218a of the reception optic 218 facing the optical receiver 204. In the embodiment illustrated in FIG. 2, the first portion 220a of the transmission optic is formed by a portion of the reception optic 218 arranged above the optical transmitter 202 and shaped to be convex with respect to the first surface 218a of the reception optic. The transmission optic further includes a second portion 220b arranged on a second surface 218b of the reception optic 218 facing away from the optical receiver 204. In the illustrated embodiment, the second portion 220b of the transmission optic is formed by a convex incision into the surface 218b in the area of the axis of rotation 206. The convex portion 220b includes a first surface 224a and second surface 224b. The first surface 224a extends into the reception optic 218 adjacent to the axis of rotation 206 essentially perpendicular to the surface 212 of the carrier 210 and in parallel to the axis of rotation 206, and is only a connection surface to connect the transmission and reception faces, but has no optical use. A second surface 224b extends from the lower end of the first surface 224a, i.e. from the end of the first surface 224a spaced apart from the surface 218b, to the surface 218b of the reception optic 218. With respect to the surface 212 of the carrier 210, the second surface 224b extends at an angle into the second direction into which the optical signal 208 is radiated from the signal source 202. According to embodiments, the angle is larger than 0° and smaller than a total reflection angle of the material used, i.e. the material of the transmission/reception optic. The angle may be between 30° and 45°, and according to an embodiment, it is −42°. In the embodiment illustrated in FIG. 2, the second surface 224b of the second portion 220b of the transmission optic is configured to be curved in a convex way.

The first surface 218a of the reception optic 218 facing the optical receiver 204 is also referred to as the first reception face, and the second surface 218b of the reception optic 218 facing away from the optical receiver 204 is also referred to as the second reception face. According to embodiments the first reception face and/or the second reception face are configured as a spherical, aspherical or free-form optic.

The transmission beam 208 radiated by the optical transmitter 202 strikes the first portion 220a of the transmission optic, causing a deflection of the beam towards the second portion 220b in the direction of the rotational axis 206, as is illustrated in FIG. 2 by the deflected beam 208'. The beam 208' strikes the second portion 220b of the transmission optic, in particular the second surface 224b, causing a deflection of the beam 208' towards the axis of rotation 206, resulting in an output beam 226 that essentially propagates along the axis of rotation 206. In other words, according to the invention, a transmission optic that includes the first portion 220a, also referred to as the first transmission face, and the second portion 220b, also referred to as the second transmission face, is provided, the two transmission faces 220a, 220b being integrated into the reception optic 218 such that the output beam 226 is displaced onto the axis of rotation 206, i.e. the transmission beam 208, 208' exits essentially centrally the transmission/reception optic 214. The transmission beam 208 is tilted towards the axis of rotation 206 by the first transmission face 220a and is directed to the second transmission face 220b formed, or arranged, centrally on the top side 218b of the transmission/reception unit 214. In turn, the second transmission face 220b tilts the deflected transmission beam 208' towards the axis of rotation, resulting in the output beam 226 arranged in parallel to axis of rotation 206. The inventive configuration leads to the fact that the light source 202 and the photodiode 204 appear virtually on the axis of rotation 206, enabling a 360° rotation of the arrangement 200 without interruptions of the connection. According to embodiments, deviations from the parallelism to the axis of rotation are possible so that the output beam 226 is essentially parallel to the axis of rotation 206.

According to embodiments, the first transmission face 220a and the second transmission face 220b are each formed by a plane surface that are arranged essentially in parallel to each other so as to cause the lateral displacement of the transmission beam 208 in order to generate the output beam 226, providing an optic design for a rotatable optical short-range transceiver for the optical wireless data transfer according to the principle of the plane-parallel plate. According to other embodiments, the transmission faces 220a, 220b may be configured as a spherical, aspherical or free-form optic, enabling the possibility of performing, beside the above-mentioned displacement, a beam formation of the transmission beam 208, 208' so as to obtain a output beam 226 with a desired shape. According to further embodiments, only one of the transmission faces 220a, 220b may be provided, and the function of the other transmission face may be realized by giving a suitable shape to the surfaces 218a and 218b, respectively, of the reception optic 218 at least at the locations where the transmission beam 208, 208' is received.

According to the invention, the reception optic 218 and the transmission optic 220 may be integrated such that a common or single transmission/reception optic or transceiver optic 214 is created, wherein the reception optic 218 forms the largest part of the transmission/reception optic 214. As described in more detail in the following, the inventive configuration of the transmission/reception unit enables the provision of a data transfer apparatus for the data transfer of components that are rotatable with respect to each other with a rotation capability of 360°, even in the case of very short distances. This ensures a reliable and continuous data transfer, and the above-described problems encountered in conventional configurations of transmission/reception units are avoided. According to the invention, it is provided that the electrical receiver element, or the optical receiver 204, e.g. including a photodiode, sits on the axis of rotation 206, and the reception optic 218 also sits on the axis of rotation 206 above the photodiode 204, as is illustrated in FIG. 2. For example, the photodiode includes a PIN diode an avalanche diode, a metal-semiconductor-metal diode, or the like. The light source, or the optical transmitter 202, is located off-center, i.e. spaced apart from the axis of rotation 206, adjacent to the photodiode 204, i.e. in the direct vicinity of the same. The optical transmitter 202 may be a laser source such as a laser diode, LD, or an incoherent light source such as a light-emitting diode, a LED.

FIG. 2 illustrates an embodiment in which the first portion 220a of the transmission optic is defined by the fact that a portion of the lower surface 218a of the reception optic 218 opposite the light source 202 is configured to be convex, whereas the second portion 220b of the transmission optic is formed by a recess in the upper surface 218b of the transmission optic 218, the recess being arranged in the center. The present invention is not limited to the configuration of the transmission/reception optic 214 according to the embodiment illustrated in FIG. 2, rather, the transmission/reception unit may also be configured differently. FIG. 3A to FIG. 3D show further embodiments for the transmission/reception optic 214.

Figure 3C:
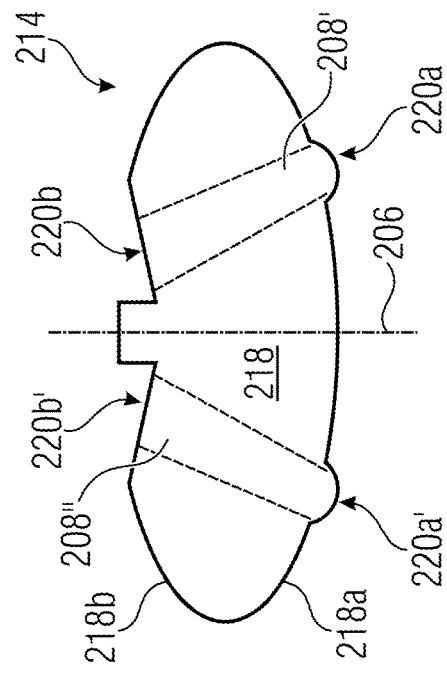
FIG. 3A to FIG. 3D show different implementations for the transmission/reception optic.
Figure 3D:
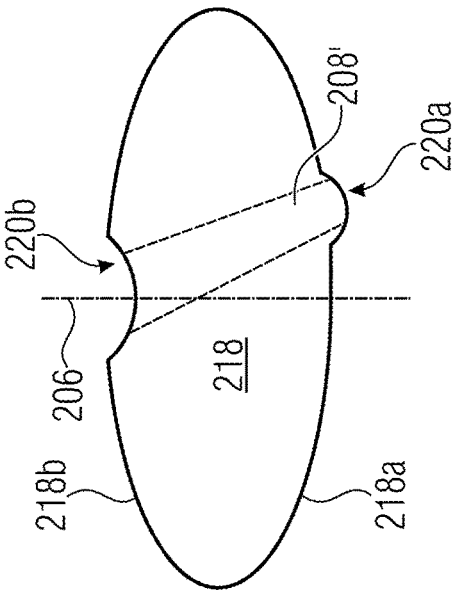
Figure 3A:
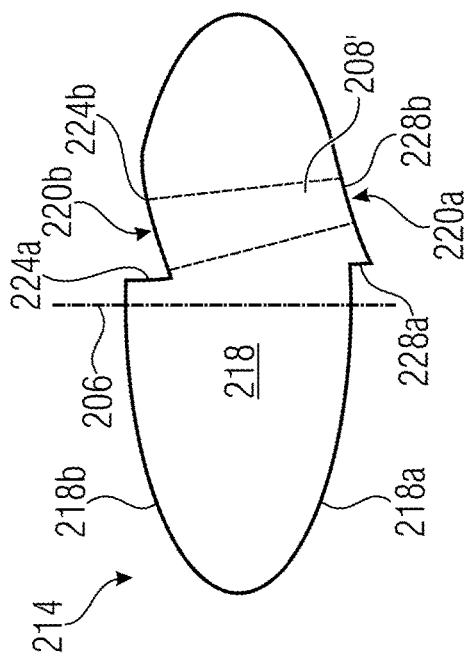

FIG. 3A shows a configuration of the transmission/reception optic 214, wherein the second portion 220b is configured as described on the basis of FIG. 2, however, the portion 220b of the transmission optic is no longer arranged centrally in the area of the reception optic 218, but laterally offset with respect to the axis of rotation 206. The first portion 220a of the transmission optic is configured similarly to the second portion 220b in the embodiment as illustrated in FIG. 3A, i.e. by a first surface 228a extending in parallel to the axis of rotation 206 and perpendicular from the lower surface 218a of the reception optic 218. A second surface 228b extends, starting from a lower end of the surface 228a, to the lower surface 218a of the reception optic 218. Similarly to the above-mentioned surface 224a, the surface 228a is only a connection surface so as to connect the transmission and reception faces, however, it has no optical use. Advantageously, the surfaces 224b and 228b of two portions 220a 220b of the transmission optic are oriented in parallel with respect to each other so as to cause the tilt of the transmission beam 208' towards the axis of rotation 206 and to generate the output beam 226 extending along the axis of rotation in direct vicinity to the same or partially overlapping with the axis of rotation 206 so that, in the embodiment illustrated in FIG. 3A, the light source 202 and the optical receiver 204 also appear virtually overlapping in a mutual area around the axis of rotation 206.

Figure 3B:
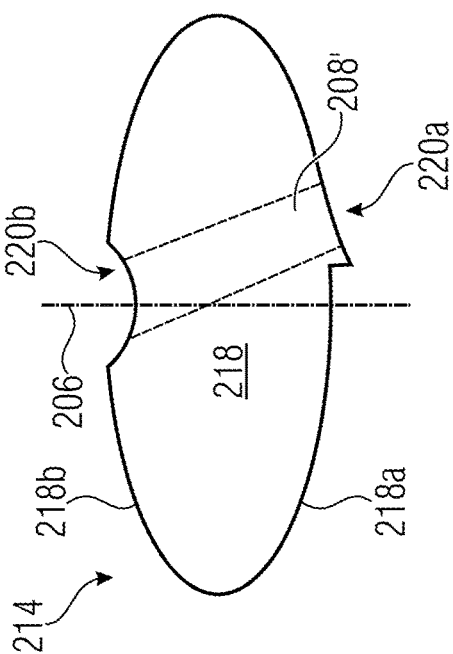

FIG. 3B shows a further configuration for the transmission/reception optic 214, wherein the first portion 220a of the transmission optic is configured as described on the basis of FIG. 3A. The second portion 220b of the transmission optic is formed centrally in the upper surface 218b of the reception optic 218 by a convex depression.

FIG. 3C shows a further implementation of transmission/reception optic 214, wherein the transmission optic contains additional portions, e.g. if the arrangement 200 according to FIG. 2 comprises additional light sources. In FIG. 3C, the respective portions 220a, 220a' and 220b, 220b' of the transmission optic are arranged offset to the axis of rotation 206 and have a structure as described on the basis of FIG. 2.

FIG. 3D shows a further implementation for the transmission/reception optic 214, wherein the first portion 220a of the transmission optic is configured as described on the basis of FIG. 2, and the second portion 220b of the transmission optic is configured as described on the basis of FIG. 3B.

In the embodiment described on the basis of FIG. 2 and FIG. 3B to FIG. 3D, the first and/or the second portion 220b of the transmission optic is configured to, in addition to the deflection of the transmission beam, cause a beam formation so as to achieve a desired shape of the output beam 226.

With respect to the above-described embodiments regarding the formation, or shaping, of the two portions 220a 220b of the transmission optic, it is to be noted that the respective configurations may also be combined in any way so that the present invention is not limited to the illustrated embodiments.

Figure 4A:
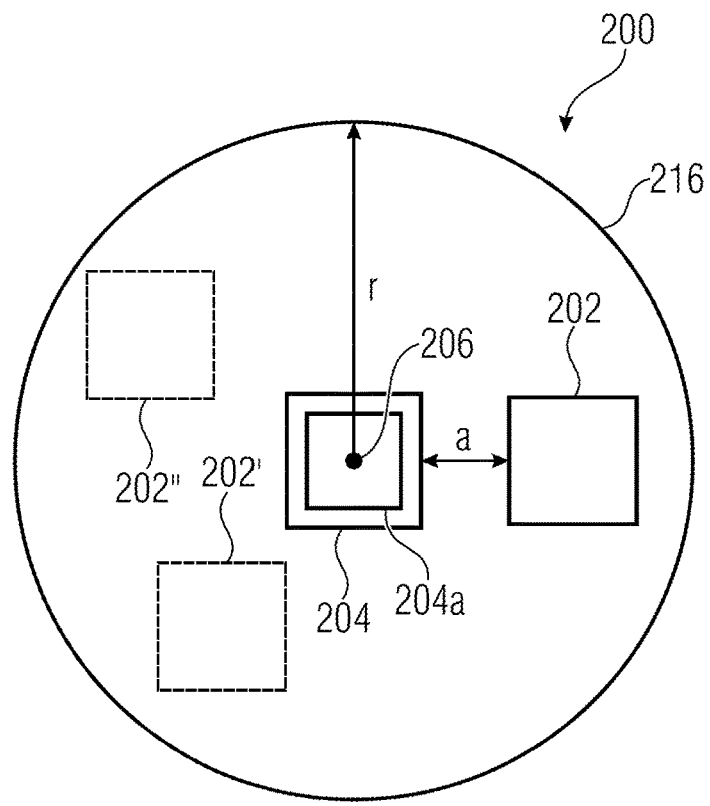
Figure 4A:
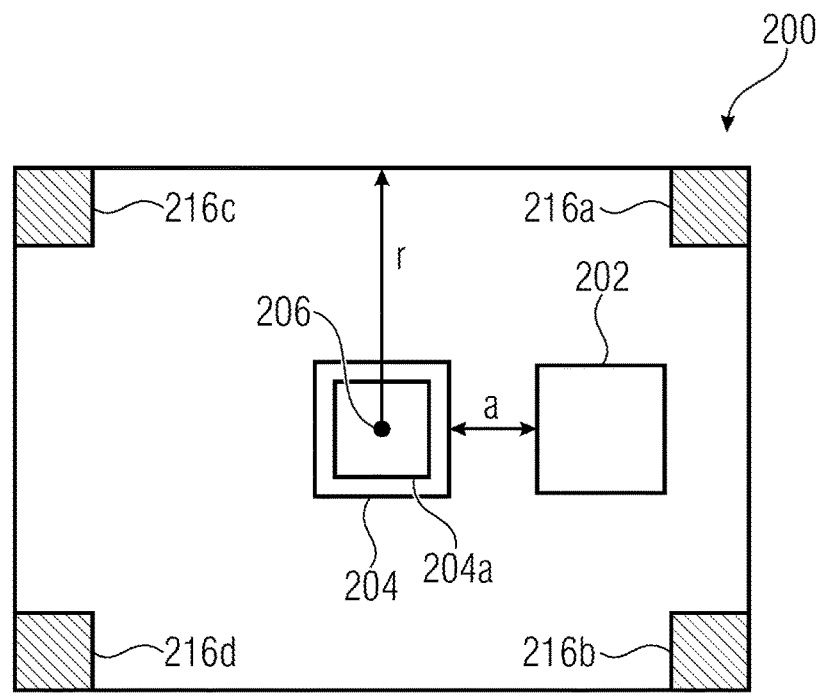

The transmission/reception unit 200 illustrated in FIG. 2 may have different shapes in a top view. FIG. 4 shows two embodiments for the configuration of the transmission/reception unit in a top view, wherein FIG. 4A illustrates a round, or circular, configuration of the transmission/reception unit 200, and FIG. 4B illustrates a rectangular or square configuration of the transmission/reception unit 200. It is obvious to a person skilled in the art that the transmission/reception unit 200 may have an arbitrary, e.g. polygonal, shape.

FIG. 4A shows a circular transmission/reception unit 200 with a radius r measured from the axis of rotation 206 to the circularly-configured holder 216 for the transmission/reception optic 214, which is not illustrated. FIG. 4A indicates a further embodiment, according to which one or several additional optical transmitters 202' 202" may be provided at the same or at a different distance to the optical reception means 204. In the embodiment illustrated in FIG. 4A, the holder 216 is illustrated to the surrounding, however, it may also be configured by individual supports or the like for holding the transmission/reception optic 214.

According to embodiments, if one or several optical transmitters 202' 202" are provided, the transmission/reception optic 214 configured according to the invention includes additional a transmission optic integrated into the reception optic 218, as is exemplarily illustrated in FIG. 3C. The additional transmission optic is arranged above the optical transmitter 220' and includes the portions 220a' and 220b' for tilting/deflecting, and possibly for the beam formation of, the transmission beam provided by the additional optical transmission unit 202'. According to other embodiments, the additional transmission optic may be configured similarly to the transmission optic 220, i.e. in the form of the embodiments illustrated in FIG. 3A, FIG. 3B or FIG. 3D.

Figure 5A:
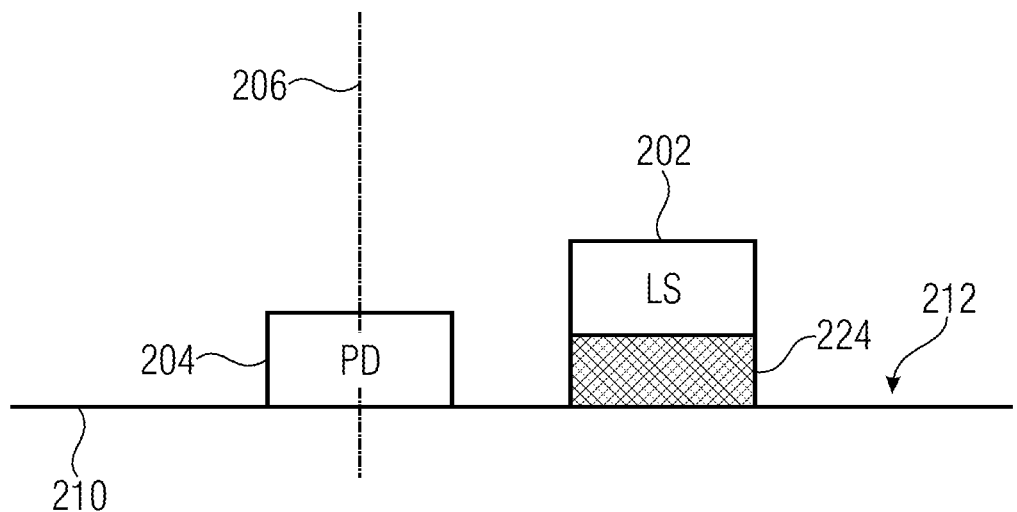
FIG. 5A and FIG. 5B show different implementations for the arrangement of optical transmitters/receivers on a carrier of the transmission/reception optic on the basis of FIG. 5A and FIG. 5B.
Figure 5B:
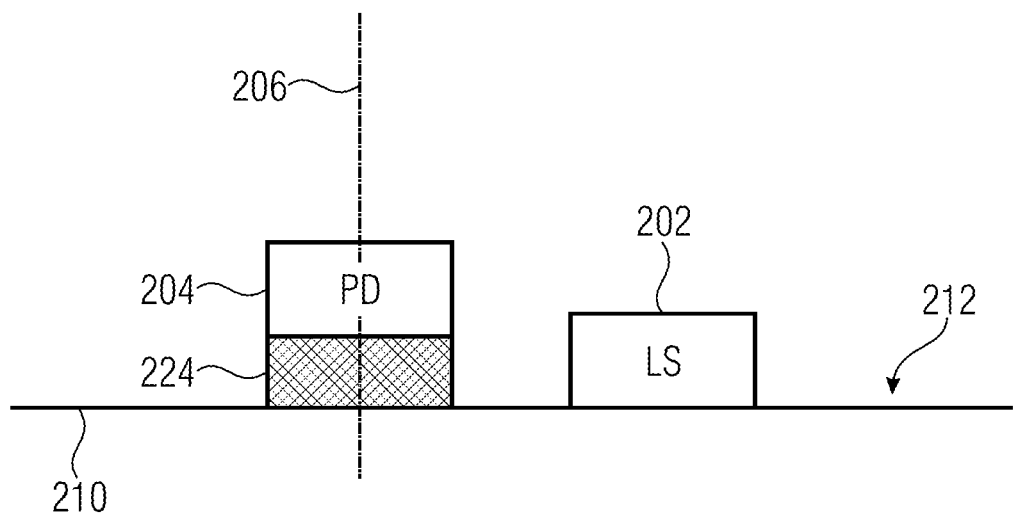

FIG. 4B shows a rectangular configuration of the transmission/reception unit 200, wherein the distance from the axis of rotation 206 to the edge of the unit 200 is referred to as the radius r. In this embodiment, the holder 216 for carrying the transmission/reception optic 214 includes four supports 216a to 216d arranged at the corners, which may obviously also be arranged differently in other embodiments. In the embodiment illustrated on the basis of FIG. 2, the optical transmitter 202 and the optical receiver 204 are both arranged on the surface 212 of the carrier 210. However, the present application is not limited to such an arrangement, rather, the elements 202 204 may be arranged with the same or different distances to the surface 212. FIG. 5 shows possible implementations for such a configuration, wherein FIG. 5A illustrates an configuration in which the optical transmitter 202 is arranged spaced apart from the carrier surface 212 by means of a suitable spacing element 224, whereas the optical receiver 204 is located on the carrier surface 212. FIG. 5B shows another embodiment, in which the optical receiver 204 is arranged spaced apart from the surface 212 of the carrier 210 by using a suitable spacer 224, whereas the optical transmitter 202 is arranged on the surface 212. In further embodiments, as described, the optical transmitter 202 and the optical receiver 204 may be arranged spaced apart from the surface of the carrier by a suitable spacer 224, wherein the distances for the optical transmitter and optical receiver may be the same or different.

Figure 6:
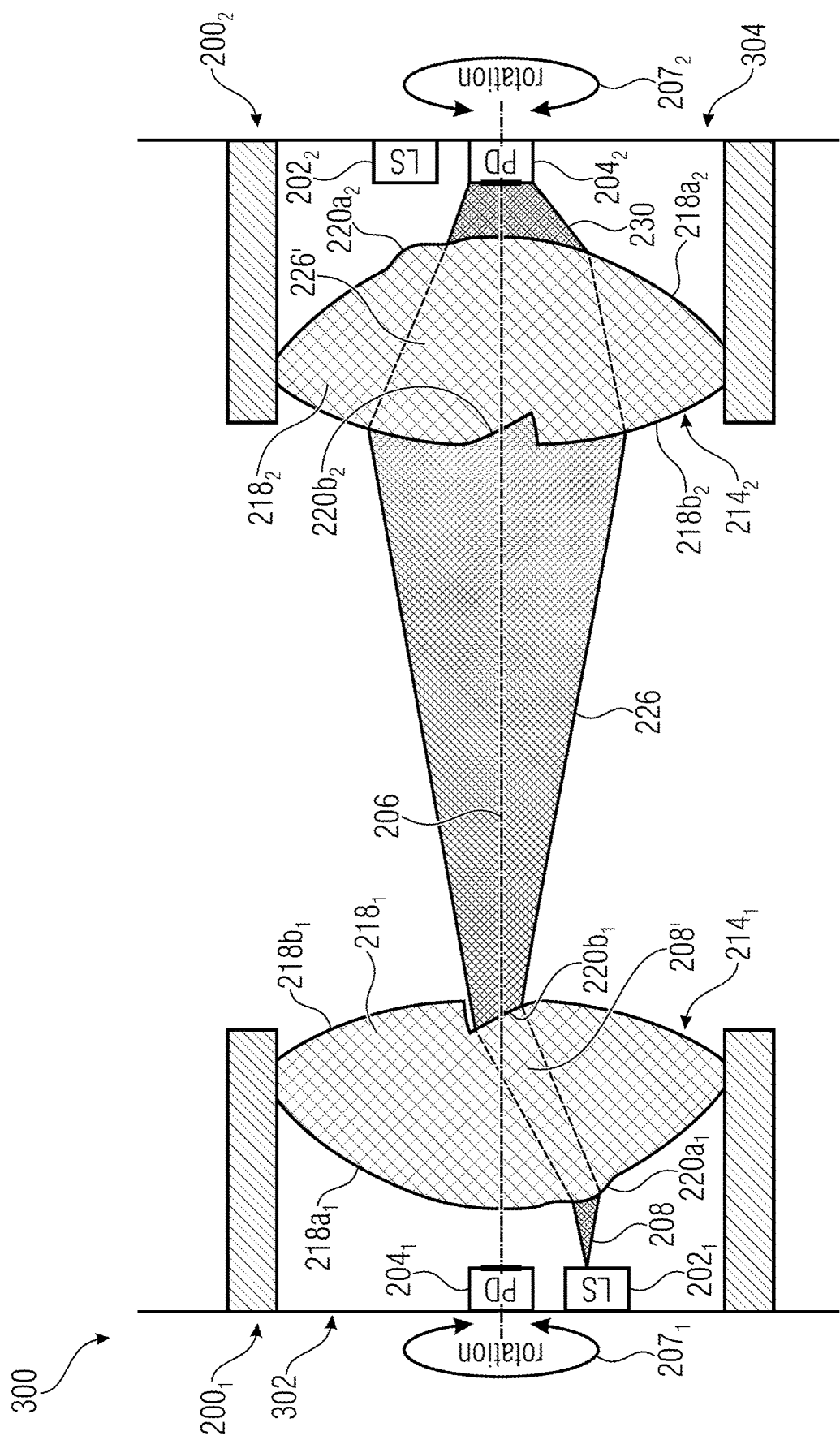
FIG. 6 shows an embodiment for signal transfer means comprising two components arranged to be rotatable with respect to each other and each provided with a transmission/reception unit configured according to the invention.

The following describes in more detail embodiments for signal transfer means using the inventive transmission/reception units, as exemplarily described on the basis of FIG. 2 to FIG. 5. FIG. 6 shows an embodiment for signal transfer means 300 comprising two components 302, 304 arranged to be rotatable with respect to each other and each being provided with a transmission/reception unit $200_1$ and $200_2$, respectively, configured according to the invention, so as to enable a wireless optical data transfer between the two components 302 304 arranged to be rotatable with respect to each other. FIG. 6 illustrates the elements of the transmission/reception unit $200_1$ described on the basis of FIG. 2, wherein the reference numerals are provided with the subscript "1" and are not described again. Also, the reception unit $200_2$ associated with the second component 304 is illustrated, and the corresponding components described on the basis of FIG. 2 are provided with the same reference numerals, but with the subscript "2", and they are not described again. During the data transfer, one or both of the transceivers may be rotated permanently with respect to each other.

FIG. 6 exemplarily shows a data transfer from the first component 302 to the second component 304, i.e. a unidirectional connection, or a unidirectional link, wherein, according to other embodiments, a simultaneous transfer in both directions is also possible. As illustrated in FIG. 6, the portions $220a_1$ and $220b_1$ of the transmission optic of the transmitting transmission/reception unit $200_1$ are configured to shape the transmission beam 208 in such a way into the output beam 226 that the output beam 226 exits the transmission/reception optic $214_1$ of the transmitting transmission/reception unit $200_1$ in a central area around the axis of rotation and is directed onto the transmission/reception optic $214_2$ of the receiving transmission/reception unit $200_2$, or illuminates the transmission/reception optic. According to embodiments, the receiving transmission/reception unit $200_2$, which may also be referred to as the reception transceiver, may be displaced from the optical Z axis, which the axis of rotation 206 coincides with, in the X direction and/or the Y direction, wherein the degree of displaceability depends on the design of the transmission and reception optic. According to embodiments, the offset may between 0 and larger than a radius of the transmission/reception optic. The beam 226 provided by the transmission transceiver, or by the transmitting transmission/reception unit 200$_1$, and directed onto the reception optic 218$_2$ is collected by the transceiver optic 214$_2$ of the reception transceiver 200$_2$ and is guided, or focused, towards the photodiode 204b by the first reception face 218$a_2$ and the second reception face 218$b_2$, wherein the area of the second portion 202$b_2$ of the transmission optic cannot be used for the focusing. The first portion 202$a_2$ of the transmission optic is arranged spaced apart from the axis of rotation 206 and does not have any influence on the focusing. FIG. 6 shows the reception beam 230 generated by transmission/reception optic 214$_2$ and focused onto photodiode 204$_2$. In other embodiments, the first portion 202$a_2$ is in the area used by the reception surface 218$a_2$, which may lead to a slight, and therefore acceptable, reduction of the reception power. The beam deflected by the reception surface 220$b_2$ is not illustrated.

Figure 7:
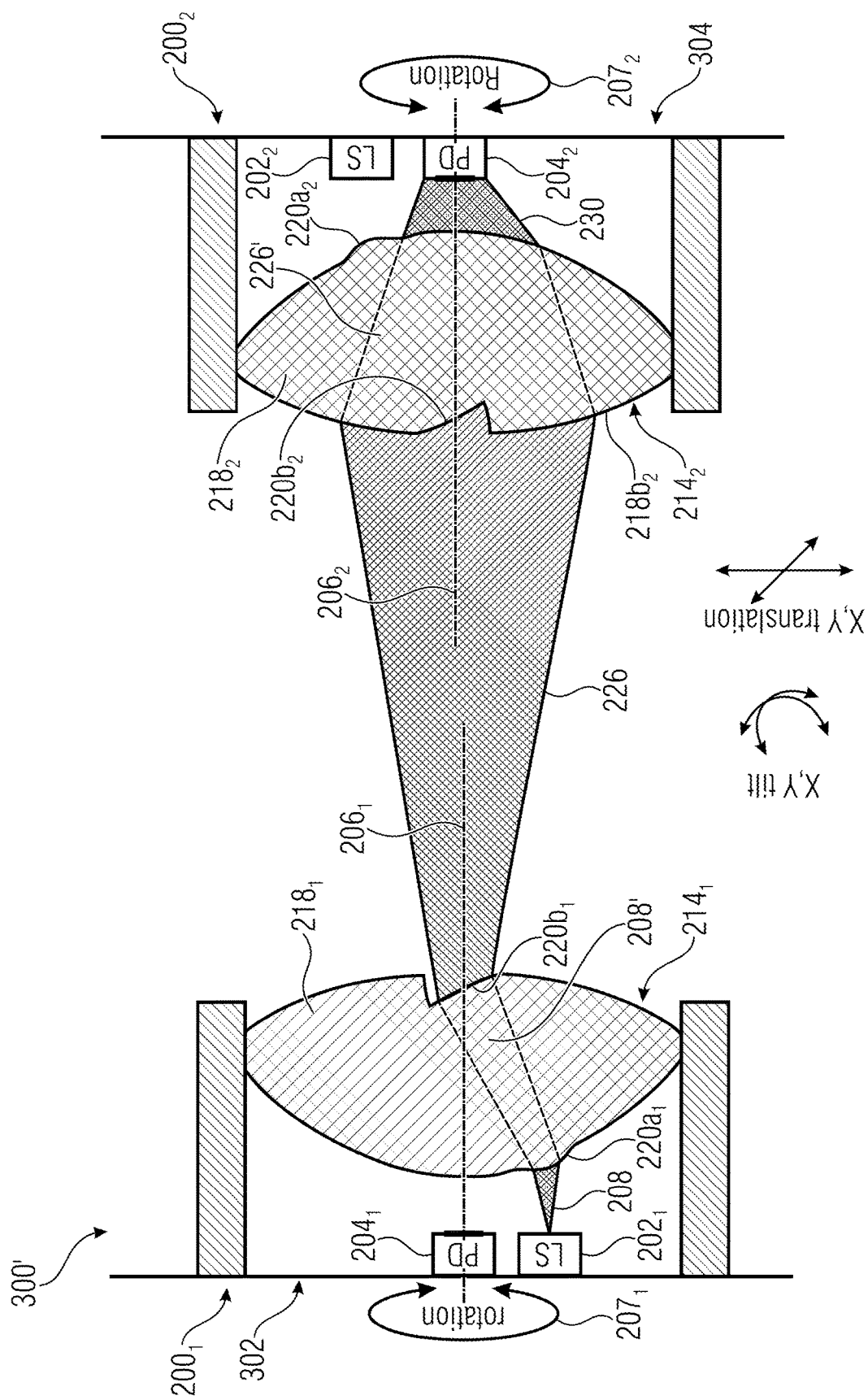
FIG. 7 shows an embodiment of the inventive transmission/reception unit, wherein the transmission/reception optic comprises a surface structure at a surface.

FIG. 6 illustrates an arrangement of the two transmission/reception units 200$_1$ and 200$_2$ that is such that both units are on the same optical axis, i.e. the common optical axis or common axis of rotation 206 illustrated in FIG. 6. However, the present invention is not limited to such configurations. Each transceiver has its own axis of rotation. These axes of rotation may be identical (e.g. FIG. 6), however, the axes of rotation are typically not identical. The two axes of rotation may be, to certain extent, displaced or tilted with respect to each other so that the transmission/reception units 200$_1$, 200$_2$ are offset with respect to each other, according to further embodiments, so that they do not comprise a common optical axis, or a common axis of rotation. FIG. 7 shows an implementation similar to that of FIG. 6, wherein the same elements are provided with the same reference numerals and are not described again. In the embodiment shown in FIG. 7, the transmission/reception units 200$_1$, 200$_2$ are arranged with an offset with respect to each other, as is indicated by reference numeral 350, e.g. the second transmission/reception unit 200$_2$ is arranged tilted in the X and Y directions so that the optical axes, or axes of rotation, 206$_1$, 206$_2$ of the two units no longer coincide, and comprise a corresponding offset. The optical axis, or axis of rotation, 206$_1$, of the first transmission/reception unit 200$_1$ is offset with respect to the optical axis, or axis of rotation, 206$_2$, of the second transmission/reception unit 200$_2$, as can be seen in FIG. 7.

The distance of the transmission/reception units 200$_1$, 200$_2$ arranged in an apparatus according to FIGS. 6 and 7 may remain small, contrary to the conventional technology, e.g. smaller than the diameter of the transmission/reception units, since, due to the inventive configuration of the transmission/reception units, even in the case of a small distance and a rotation of the transmission/reception units 200$_1$, 200$_2$ with respect to each other, the transmission beam 226 provided by the transmitting unit strikes the reception optic of the receiving unit that guides the incident light onto the photodiode, so that, even in case of a small distance and a rotation, a reliable data transfer, or data connection, is ensured even in the case of a rotation.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An optical transmission/reception unit, comprising:
   a carrier rotatable around an axis of rotation,
   an optical receiver arranged at the carrier on the axis of rotation so as to receive an optical reception signal from a first direction,
   an optical transmitter arranged at the carrier adjacent to the optical receiver so as to emit an optical transmission signal in a second direction, and
   a transmission/reception optic arranged at the carrier on the axis of rotation above the optical receiver and extending across the optical receiver and the optical transmitter, the transmission/reception optic comprising a reception optic and a transmission optic, the transmission optic being integrated into the reception optic,
   wherein the reception optic is configured to focus the optical reception signal striking the transmission/reception optic towards the optical receiver on the axis of rotation,
   wherein the transmission optic is configured to guide the optical transmission signal emitted by the optical transmitter onto the axis of rotation so that a transmission beam from the transmission/reception optic propagates along the axis of rotation,
   wherein the transmission optic is formed by a portion of a surface of the reception optics facing away from the optical receiver,
   wherein the portion is formed to deflect the optical transmission signal received from a transmission face in a direction parallel to the axis of rotation,
   wherein the portion is formed by a recess in the surface of the reception optic facing away from the optical receiver, and
   wherein a function of the transmission face can be realized by a suitable shaping of a surface of the reception optic facing the optical receiver.

2. The optical transmission/reception unit according to claim 1, wherein the transmission optic is further formed by a further portion of a surface of the reception optic facing the optical receiver, and
   wherein the further portion is configured to deflect the optical transmission signal emitted by the optical transmitter towards the axis of rotations and to guide the same onto the portion.

3. The optical transmission/reception unit according to claim 2, wherein the further portion is arranged spaced apart from the optical transmitter in a direction along which the optical transmitter emits the optical transmission signal.

4. The optical transmission/reception unit according to claim 2, wherein the further portion is formed by a projection in the surface of the reception optic facing the optical receiver.

5. The optical transmission/reception unit according to claim 2,
   wherein the further portion comprises the transmission face arranged above the optical transmitter and tilting towards the axis of rotation the optical transmission signal emitted by the optical transmitter, and
   the portion comprises a further transmission face arranged centrally on the surface of the reception optic facing away from the optical receiver and tilting in parallel to the axis of rotation the optical transmission signal received from the transmission face.

6. The optical transmission/reception unit according to claim 5, wherein the transmission face and the further transmission face each comprise a plane face in parallel with each other so as to cause a lateral displacement of the optical transmission signal towards the axis of rotation.

7. The optical transmission/reception unit according to claim 5, wherein the transmission face and the further transmission face are configured as a spherical, aspherical or free-form optic so as to also cause, beside a lateral displacement of the optical transmission signal towards the axis of rotation, a beam formation of the optical transmission signal in order to acquire a desired transmission beam.

8. The optical transmission/reception unit according to claim 5, wherein the transmission face and the further transmission face are configured differently.

9. The optical transmission/reception unit according to claim 2, wherein
the further portion comprises the transmission face arranged above the optical transmitter and guiding towards the axis of rotation the optical transmission signal emitted by the optical transmitter.

10. The optical transmission/reception unit according to claim 9, wherein the transmission face is configured as a spherical, aspherical or free-form optic so as to cause a beam formation of the optical transmission signal in order to acquire a desired transmission beam.

11. The optical transmission/reception unit according to claim 1, wherein the portion is arranged on the axis of rotation or adjacent to the axis of rotation.

12. The optical transmission/reception unit according to claim 1,
wherein the recess comprises a first surface extending, starting from the surface facing away from the optical receiver, in parallel to the axis of rotation into the reception optic, and
the recess comprises a second surface adjacent to the first surface and extending, starting from the first surface, at an angle of less than or equal to 90° with respect to the carrier towards the surface facing away from the optical receiver.

13. The optical transmission/reception unit according to claim 12, wherein the angle is larger than 0° and smaller than a total reflection angle of the material used.

14. The optical transmission/reception unit according to claim 12, wherein the first surface is arranged adjacent to the axis of rotation and the second surface intersects the axis of rotation, or
the first surface is arranged adjacent to the axis of rotation and the second surface extends away from the axis of rotation.

15. The optical transmission/reception unit according to claim 1, wherein the carrier comprises a carrier surface from which the axis of rotation extends perpendicularly.

16. The optical transmission/reception unit according to claim 15, wherein the optical receiver and the optical transmitter are arranged on the carrier surface, or wherein the optical receiver and the optical transmitter are arranged at the carrier surface with the same or different distances to the carrier surface.

17. An apparatus for a signal transfer, comprising
at least one first optical transmission/reception unit according to claim 1; and
at least one second optical transmission/reception unit according to claim 1;
wherein the first and second optical transmission/reception units are arranged in such a way with respect to each other that a transmission beam of a transmission/reception unit illuminates the receiver optic of an opposite transmission/reception unit.

18. The apparatus according to claim 17, implemented for a bidirectional transfer in both directions or for a unidirectional transfer in only one direction.

19. The apparatus according to claim 17, wherein the axes of rotation of the first and second optical transmission/reception units form a mutual axis, or wherein the axes of rotation of the first and second optical transmission/reception unit comprise a specified offset, and wherein the specified offset is between 0 and larger than a radius of the transmission/reception optic.

20. Apparatus according to claim 17, wherein the first and the second optical transmission/reception units are arranged with a distance to each other that is smaller than a diameter of the transmission/reception units.

* * * * *